(12) United States Patent
Lee

(10) Patent No.: US 9,756,398 B2
(45) Date of Patent: Sep. 5, 2017

(54) TV AND OPERATING METHOD THEREOF

(71) Applicant: LG ELECTRONICS INC., Seoul (KR)

(72) Inventor: Jaekyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/492,880

(22) Filed: Sep. 22, 2014

(65) Prior Publication Data

US 2015/0113568 A1    Apr. 23, 2015

(30) Foreign Application Priority Data

Oct. 23, 2013  (KR) ........................ 10-2013-0126272

(51) Int. Cl.
| | |
|---|---|
| *H04N 21/485* | (2011.01) |
| *H04N 21/431* | (2011.01) |
| *H04N 21/482* | (2011.01) |
| *H04N 21/462* | (2011.01) |
| *H04N 21/433* | (2011.01) |

(Continued)

(52) U.S. Cl.
CPC ..... *H04N 21/4858* (2013.01); *H04N 5/44591* (2013.01); *H04N 21/234336* (2013.01); *H04N 21/25866* (2013.01); *H04N 21/25891* (2013.01); *H04N 21/42222* (2013.01); *H04N 21/439* (2013.01); *H04N 21/4312* (2013.01); *H04N 21/4314* (2013.01); *H04N 21/4316* (2013.01); *H04N 21/4332* (2013.01); *H04N 21/4396* (2013.01); *H04N 21/44222* (2013.01); *H04N 21/440236* (2013.01); *H04N 21/4622* (2013.01); *H04N 21/4821* (2013.01); *H04N 21/4823* (2013.01); *H04N 21/6581* (2013.01); *H04N 21/6582* (2013.01); *H04N 21/8106* (2013.01); *H04N 5/45* (2013.01); *H04N 2005/4428* (2013.01); *H04N 2005/44556* (2013.01)

(58) Field of Classification Search
CPC ........... H04N 5/44591; H04N 21/4316; H04N 21/4438; H04N 21/4858; H04N 21/4221; H04N 5/44543; H04N 21/466; H04N 21/482; H04N 21/485
USPC .................................... 725/47; 348/564–568
See application file for complete search history.

(56) References Cited

U.S. PATENT DOCUMENTS 4,959,719 A *  9/1990  Strubbe et al. ............... 348/565
5,530,797 A    6/1996  Uya et al.
(Continued)

FOREIGN PATENT DOCUMENTS

| CN | 1801885 A | 7/2006 |
|---|---|---|
| CN | 101378491 A | 3/2009 |

(Continued)

*Primary Examiner* — Nathan Flynn
*Assistant Examiner* — Cynthia Fogg
(74) *Attorney, Agent, or Firm* — Birch, Stewart, Kolasch & Birch, LLP

(57) ABSTRACT

Provided is an operating method of a TV. The method includes: receiving a multi screen enter command according to a user input; transmitting a multi screen request signal to a server in response to the multi screen enter command; receiving a multi screen response signal corresponding to the multi screen request signal transmitted through a first channel from the server; entering a multi screen mode according to multi screen information included in the multi screen response signal; and storing the multi screen information.

15 Claims, 11 Drawing Sheets

(51) Int. Cl.
*H04N 21/2343* (2011.01)
*H04N 21/258* (2011.01)
*H04N 21/422* (2011.01)
*H04N 21/439* (2011.01)
*H04N 21/4402* (2011.01)
*H04N 21/442* (2011.01)
*H04N 21/658* (2011.01)
*H04N 21/81* (2011.01)
H04N 5/44 (2011.01)
H04N 5/445 (2011.01)
H04N 5/45 (2011.01)

(56) References Cited

U.S. PATENT DOCUMENTS

| | | | | |
|---|---|---|---|---|
| 5,926,230 A | * | 7/1999 | Niijima et al. | 725/56 |
| 5,929,927 A | * | 7/1999 | Rumreich et al. | 348/563 |
| 2002/0033899 A1 | * | 3/2002 | Oguma | 348/565 |
| 2002/0067433 A1 | * | 6/2002 | Yui | G09G 5/14 |
| | | | | 348/588 |
| 2004/0130568 A1 | * | 7/2004 | Nagano | G06F 3/1454 |
| | | | | 715/733 |
| 2006/0230427 A1 | | 10/2006 | Kunkel et al. | |
| 2007/0047912 A1 | * | 3/2007 | Hattori et al. | 386/95 |
| 2007/0192816 A1 | * | 8/2007 | Collet et al. | 725/116 |
| 2007/0195737 A1 | | 8/2007 | Walker et al. | |
| 2007/0250896 A1 | * | 10/2007 | Parker et al. | 725/135 |
| 2007/0275762 A1 | | 11/2007 | Aaltone et al. | |
| 2008/0022352 A1 | * | 1/2008 | Seo | H04N 5/45 |
| | | | | 725/142 |
| 2008/0098402 A1 | | 4/2008 | Lee et al. | |
| 2008/0278628 A1 | * | 11/2008 | Hirata | H04N 5/44513 |
| | | | | 348/564 |
| 2009/0066839 A1 | * | 3/2009 | Jung et al. | 348/565 |
| 2009/0147140 A1 | * | 6/2009 | Kim | H04N 5/45 |
| | | | | 348/565 |
| 2009/0322714 A1 | | 12/2009 | Lee et al. | |
| 2010/0180297 A1 | | 7/2010 | Levine et al. | |
| 2010/0242080 A1 | | 9/2010 | Henry | |
| 2010/0309376 A1 | * | 12/2010 | Lei | 348/584 |
| 2011/0105187 A1 | * | 5/2011 | Dobroth | G06F 3/0481 |
| | | | | 455/566 |
| 2012/0106643 A1 | * | 5/2012 | Fujimoto | H04N 21/234363 |
| | | | | 375/240.16 |
| 2013/0047182 A1 | * | 2/2013 | Gudlavenkatasiva et al. | 725/38 |
| 2013/0278828 A1 | * | 10/2013 | Todd | H04N 5/45 |
| | | | | 348/564 |
| 2014/0068504 A1 | * | 3/2014 | Sun | G06F 3/0481 |
| | | | | 715/794 |
| 2015/0317026 A1 | * | 11/2015 | Choi | G06F 3/0416 |
| | | | | 345/660 |
| 2015/0325211 A1 | * | 11/2015 | Lee | G06F 3/14 |
| | | | | 345/1.3 |

FOREIGN PATENT DOCUMENTS

| | | |
|---|---|---|
| CN | 101489065 A | 3/2009 |
| CN | 2702557 Y | 12/2009 |
| CN | 101594501 A | 12/2009 |
| CN | 103002346 A | 3/2013 |
| FR | 2 902 568 A1 | 12/2007 |

* cited by examiner

FIG.9
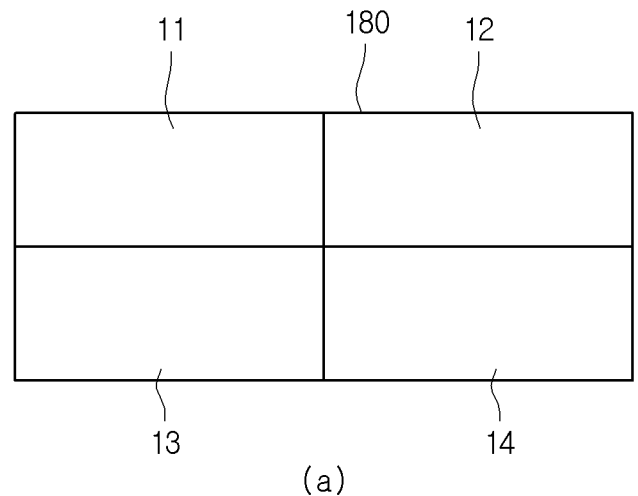
(a)
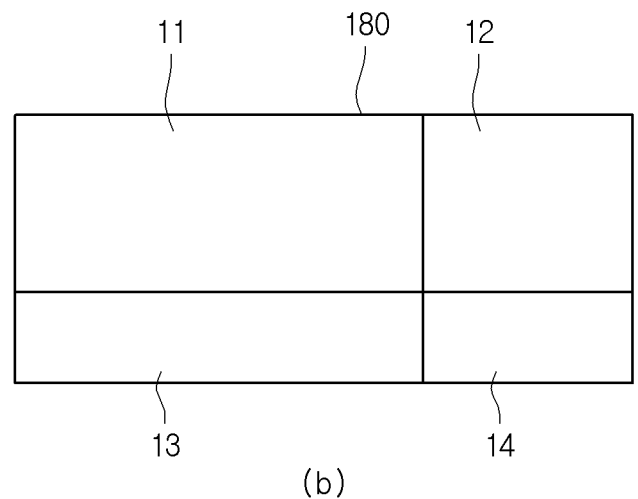
(b)
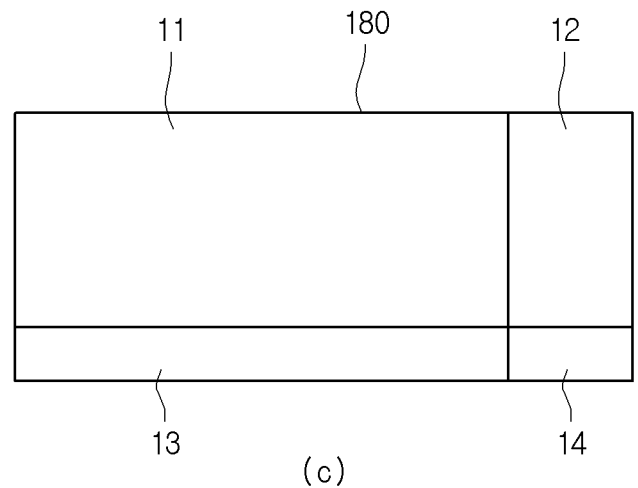
(c)

|  | Sat | | | Sun | |
|---|---|---|---|---|---|
|  | ....9 | 10 | 11 | ....9 | 8 |
| CH1 | | 93 — ▢ | DRAMAA — 41 | | |
| CH2 | | 91 — ▦ | BASEBALL(L:D) — 51 | | |
| CH3 | | | DOCUMENTARYB — 61 | | |
| CH4 | | 91 — ▦ | BASEBALL(H:N) — 52 | | |
| CH5 | | | ANIMATIONC — 71 | | |
| CH6 | | 93 — ▢ | NEWSD — 42 | | |
| CH7 | | 91 — ▦ | BASEBALL(M:P) — 53 | | |
| CH8 | | 91 — ▦ | BASEBALL(O:Q) — 54 | | |

30

TV AND OPERATING METHOD THEREOF

CROSS-REFERENCE TO RELATED APPLICATIONS

This application claims the benefit of Korean Patent Application No. 10-2013-0126272, filed on Oct. 23, 2013 entitled "TV AND OPERATING METHOD THEREOF", which is hereby incorporated by reference in its entirety into this application.

BACKGROUND

The present disclosure relates to a TV and an operating method thereof, and particularly, to a TV providing a channel for multi screen display and an operating method thereof.

Recently, a digital TV service using a wired or wireless communication network becomes generalized. The digital TV service may provide various services that cannot be provided from an existing analog broadcast service.

Especially, as internet protocol televisions (IPTVs) and smart TVs share contents such as images with user terminals such as smartphones and display them recently, high-quality contents captured by mobile terminals are displayed to users through large-sized screens.

Moreover, as the number of channels provided through TVs is increased, a multi screen technique for displaying a plurality of programs supplied from a plurality of channels on one screen at the same time is in development.

SUMMARY

Embodiments provide a TV providing a multi screen through one channel and an operating method thereof.

In one embodiment, provided is an operating method of a TV. The method includes: receiving a multi screen enter command according to a user input; transmitting a multi screen request signal to a server in response to the multi screen enter command; receiving a multi screen response signal corresponding to the multi screen request signal transmitted through a first channel from the server; entering a multi screen mode according to multi screen information included in the multi screen response signal; and storing the multi screen information, wherein the multi screen information includes at least one of information on the number of multi screen configuration areas configuring one screen, size information on each of a plurality of multi screen configuration areas, and program information outputted from each of the plurality of multi screen configuration areas.

In another embodiment, provided is a TV allocating a dynamic channel to receive multi screen information transmitted from a server. The TV includes: a display unit displaying a multi screen including a plurality of multi screen configuration areas according to the multi screen information in a multi screen mode; a user interface unit receiving a user input for channel selection; a tuner receiving a broadcast signal corresponding to a broadcast channel selected according to a user input; a demodulation unit demodulating a broadcast signal received through the turner and decoding the broadcast channel to output a stream signal; a network interface unit receiving the multi screen information from the server; a storage unit storing the multi screen information; and a control unit transmitting a multi screen request signal to the server through the network interface unit when a multi screen enter command according to a user input for selecting a plurality of channels through the user interface unit is transmitted, entering the multi screen mode according to the multi screen information included in a multi screen response signal when the multi screen response signal transmitted through a first channel is received from the server, and storing the multi screen information included in the multi screen response signal in the storage unit, wherein the multi screen information includes at least one of information on the number of multi screen configuration areas configuring one screen, size information on each of a plurality of multi screen configuration areas, and program information outputted from each of the plurality of multi screen configuration areas.

The details of one or more embodiments are set forth in the accompanying drawings and the description below. Other features will be apparent from the description and drawings, and from the claims.

BRIEF DESCRIPTION OF THE DRAWINGS

FIG. 9 is a view illustrating a multi screen where a size change of a configuration area is available according to an embodiment of the present invention.

DETAILED DESCRIPTION OF THE EMBODIMENTS

Hereinafter, a TV and an operating method thereof according to an embodiment of the present invention are described in detail with reference to the accompanying drawings.

A TV according to an embodiment of the present invention, for example, as an artificial TV adding a computer supporting function to a broadcast receiving function, may have an easy-to-use interface such as a handwriting type input device, a touch screen, or a spatial remote controller. Moreover, with the support of a wired or wireless internet function, the TV may perform a function such as e-mail, web browsing, internet banking, or online game by accessing internet or computers. A standardized general-purpose OS may be used for such various functions.

Accordingly, since various applications are added or deleted freely on a general-purpose OS kernel, a TV described in the present invention may perform user-friendly various functions. In more detail, a TV device described in the present invention, for example, may be a network TV, an HBBTV, a smart TV, an LED TV, or an OLED TV, and if necessary, may be applied to a smartphone.

Furthermore, embodiments of the present invention will be described in detail with reference to the accompanying drawings and the contents therein but the present invention is not limited thereto.

Terms used in this present invention are selected from currently and extensively used general terms as far as possible in consideration of functions of the present invention, but differ according to the intents or customs of those skilled in the art or the advent of new technologies. Additionally, in certain cases, there are terms that are arbitrarily selected by the applicant, and in this case, their meaning will be listed in detail in the corresponding description part of the present invention. Accordingly, terms used in the present invention should be defined on the basis of the meanings that the terms have and the contents throughout the present invention.

Figure 1:
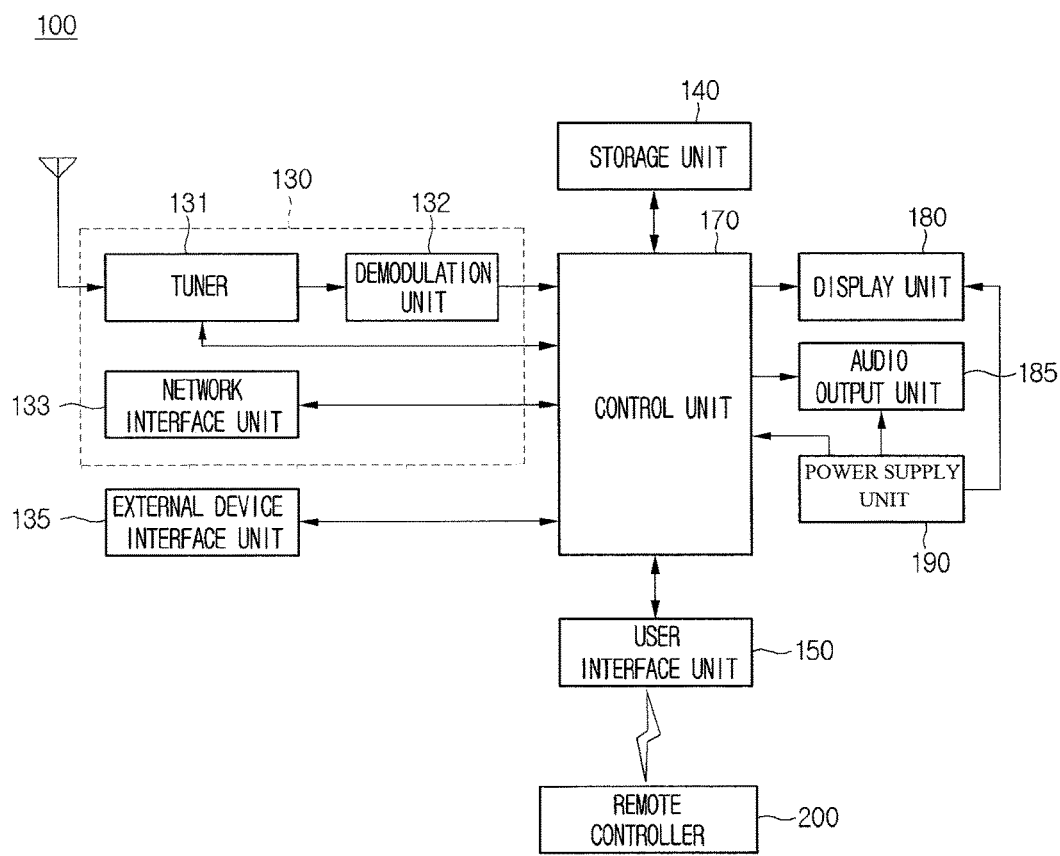
FIG. 1 is a block diagram illustrating a configuration of a TV according to an embodiment of the present invention.

FIG. 1 is a block diagram illustrating a configuration of a TV according to an embodiment of the present invention.

Referring to FIG. 1, the TV 100 may include a broadcast reception unit 130, an external device interface unit 135, a storage unit 140, a user interface unit 150, a control unit 170, a display unit 180, an audio output unit 185, and a power supply unit 190. Moreover, the broadcast reception unit 130 may include a tuner 131, a demodulation unit 132, and a network interface unit 133.

The tuner 131 selects an RF broadcast signal corresponding to a channel selected by a user or pre-stored all channels from among radio frequency (RF) broadcast signals received through an antenna, and converts the selected RF broadcast signal into an intermediate frequency signal or a baseband image or sound signal.

For example, if the selected RF broadcast signal is a digital broadcast signal, the tuner 131 converts the selected RF broadcast signal into a digital IF signal DIF, and if the selected RF broadcast signal is an analog broadcast signal, the tuner 131 converts the selected RF broadcast signal into an analog baseband image or sound signal CVBS/SIF.

That is, the tuner 131 processes both a digital broadcast signal and an analog broadcast signal. The analog baseband image or sound signal CVBS/SIF outputted from the tuner 131 may be directly inputted to the control unit 170.

Additionally, the tuner 131 may receive an RF broadcast signal of a single carrier according to the Advanced Television System Committee (ATSC) type or an RF broadcast signal of a plurality of carriers according to the Digital Video Broadcasting (DVB) type.

Moreover, the tuner 131 sequentially selects the RF broadcast signals of all broadcast channels stored through a channel memory function from among RF broadcast signals received through an antenna, and converts the selected RF broadcast signal into an intermediate frequency signal or a baseband image or sound signal.

The demodulation unit 132 may perform a demodulation operation by receiving the digital IF signal DIF converted by the tuner 131. For example, when the digital IF signal outputted from the tuner 131 is the ATSC type, the demodulation unit 132 may perform 8-Vestigal Side Band (VSB) demodulation.

Additionally, the demodulation unit 132 may perform channel decoding, and for this, may include a Trellis Decoder, a De-interleaver, and a Reed Solomon Decoder, so as to perform Trellis decoding, de-interleaving, and Reed Solomon decoding.

For example, when the digital IF signal outputted from the tuner 131 is the DVB type, the demodulation unit 132 may perform Coded Orthogonal Frequency Division Modulation (COFDMA) demodulation.

Additionally, the demodulation unit 132 may perform channel decoding, and for this, may include a convolution decoder, a De-interleaver, and a Reed Solomon Decoder, so as to perform convolution decoding, de-interleaving, and Reed Solomon decoding.

After performing demodulation and channel decoding, the demodulation unit 132 may output a stream signal TS, and the stream signal TS may be a signal that a video signal, an audio signal, or a data signal is multiplexed.

For example, the stream signal may be an MEPG-2 transport stream (TS) where a video signal of the MEPG-2 standard and an audio signal of the Dolby AC-3 standard are multiplexed. In more detail, the MPEG-2 TS may include a 4 byte header and a 184 byte payload.

The header includes information notifying the start of a signal and a packet identifier (PID) for a signal in a payload and the payload includes image, audio, and EPG information for each channel. The EPG information may include a System Time Table (STT) by Program and System Information Protocol (PSIP), a Master Guide Table (MGT), a Virtual Channel Table (VCT), a Rating Region Table (RRT), and an Event Information Table (EIT).

Moreover, the demodulation unit 132 may include an ATSC demodulation unit and a DVB modulation unit, separately, according to the ATSC standard and the DVB standard.

The stream signal outputted from the demodulation unit 132 may be inputted to the control unit 170. The control unit 170 performs demultiplexing and audio/video signal processing, and then outputs an image to the display unit 180 and outputs sound to the audio output unit 185.

The external device interface unit 135 may access an external device and the TV 100, and for this, may include an A/V input/output unit (not shown) or a wireless communication unit (not shown).

The external device interface 135 may be wire/wireless connected to an external device such as a digital versatile disk (DVD) player, a Blu ray player, a gaming console, a camera, a camcorder, and a computer (for example, a notebook computer).

Additionally, the external device interface 135 delivers a video, audio, or data signal inputted from the outside through a connected external device, to the control unit 170 of the TV 100, and outputs the video, audio, or data signal processed by the control unit 170, to a connected external device.

The A/V input/output unit may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, and a D-SUB terminal in order to input video and audio signals of an external device to the TV 100.

Moreover, the wireless communication unit (not shown) may perform a short-range wireless communication with another electronic device. For example, the TV 100 may be connected to another electronic device via a network according to communication standards such as Bluetooth, Radio Frequency Identification (RFID), infrared Data Association (IrDA), Ultra Wideband (UWB), ZigBee, and Digital Living Network Alliance (DLNA).

Additionally, the external device interface 135 may perform an input/output operation with a settop box in access to the settop box through at least one of the above-mentioned various terminals.

Moreover, the external device interface 135 receives an application or an application list in an adjacent external device and delivers it to the control unit 170 or the storage 140.

The network interface unit 133 may provide an interface to connect the TV 100 to a wired/wireless network including an Internet network. For example, the network interface unit 133 may access a wired network through an Ethernet terminal, and may access a wireless network through communication standards such as Wireless LAN (WLAN) (for example, Wi-Fi), Wireless broadband (Wibro), World Interoperability for Microwave Access (Wimax), and High Speed Downlink Packet Access (HSDPA).

Moreover, the network interface unit 133 may transmit or receive data to or from another user or another electronic device through an accessed network or another network linked to an accessed network.

Moreover, the network interface unit 133 may transmit contents data stored in the TV 100 to a selected user or a selected electronic device among pre-registered other users or other electronic devices.

The network interface unit 133 may access a predetermined web page through an accessed network or another network linked to an accessed network. That is, in access to a predetermined web page via a network, data are transmitted to or received from a corresponding server.

Then, the network interface unit 133 may receive contents or data provided from a CP or a network operator. That is, the network interface unit 133 may receive contents such as movies, advertisings, games, VODs, and broadcast signals, which are provided from a CP or a network provider via a network, and information relating thereto.

Additionally, the network interface unit 133 may receive the update information and file of firmware provided from a network operator, and may transmit data to an internet or content provider or a network operator.

The network interface unit 133 may select and receive a desired application among public applications open to the air via a network.

The storage unit 140 stores a program for each signal processing and control in the control unit 170, and also stores processed video, audio, or data signals.

Additionally, the storage unit 140 may temporarily store video, audio or data signals inputted from the external device interface unit 135 or the network interface unit 133, and also may store information on a predetermined channel through a channel memory function.

The storage unit 140 may store an application or an application list inputted from the external device interface unit 135 or the network interface unit 133.

The storage unit 140 may include at least one type of a storage medium selected from flash memory type memory, hard disk type memory, multimedia card micro type memory, card type memory (for example, SD or XD memory), Random Access Memory (RAM), and Read-Only Memory (EEPROM).

The TV 100 may play a contents file (for example, a video file, a still image file, a music file, a document file, and an application file) stored in the storage unit 140 and may then provide it to a user.

The user interface unit 150 may deliver a signal that a user inputs to the control unit 170, or may deliver a signal from the control unit 170 to a user. For example, the user interface unit 150 may receive a control signal for power on/off, channel selection, or screen setting from the remote controller 200 and then, may process the received control signal, or may transmit a control signal from the control unit 170 to the remote controller 200, according to various communication types such as an RF communication type or an IR communication type.

Additionally, the user interface unit 150 may deliver to the control unit 170 a control signal inputted from a local key (not shown) such as a power key, a channel key, a volume key, or a setting key.

For example, the user interface unit 150 may deliver to the control unit 170 a control signal inputted from a sensor (not shown) sensing a user's gesture, or may transmit a signal from the control unit 170 to a sensor (not shown). Furthermore, the sensor (not shown) may include a touch sensor, an audio sensor, a position sensor, and a motion sensor.

The control unit 170 may demultiplex a stream inputted from the tuner 131, the demodulation unit 132, or the external device interface, or may process demultiplexed signals so as to generate and output a signal for video or audio.

A video signal image-processed by the control unit 170 may be inputted to the display unit 180, and then, may be displayed as an image corresponding to a corresponding video signal. Additionally, a video signal image-processed by the control unit 170 may be inputted to an external output device through the external device interface unit 135.

An audio signal processed by the control unit 170 may be outputted to the audio output unit 185. Additionally, a sound signal processed by the control unit 170 may be inputted to an external output device through the external device interface unit 135.

Besides that, the control unit 170 may control overall operations in the TV 100. For example, the control unit 170 controls the tuner 131 to tune an RF broadcast corresponding to a channel that a user selects or a pre-stored channel.

Moreover, the control unit 170 may control the TV 100 through a user instruction inputted through the user interface unit 150 or an internal program, or may download an application or an application list that a user wants into the TV 100 by accessing a network.

For example, the control unit 170 controls the tuner 131 to input a signal of a selected channel through the user interface unit 150 according to a received predetermined channel select command, and processes video, audio, or data signals of a selected channel.

The control unit 170 may allow channel information that a user selects to be outputted through the display unit 180 or the audio output unit 185, in addition to processed video or sound signals.

Additionally, the control unit 170 allows video signals or audio signals from an external device such as a camera or a camcorder, which are inputted through the external device interface unit 135, to be outputted through the display unit 180 or the audio output unit 184 according to an external device image playback command received through the user input interface unit 150.

Furthermore, the control unit 170 may control the display unit 180 to display an image. For example, a broadcast image inputted through the tuner 131, an external input image outputted through the external device interface unit 135, an image inputted through a network interface unit, or an image stored in the storage unit 140 may be controlled to be displayed on the display unit 180. In this case, an image displayed on the display unit 180 may be a still image or a moving image, and also may be a 2D or 3D image.

Additionally, the control unit 170 may perform a control to play contents stored in the TV 100, received broadcast contents, or external input contents inputted from the outside, and the contents may be in various forms, for example, a broadcast image, an external input image, an audio file, a still image, an accessed web screen, and a document file.

Moreover, although not shown in FIG. 1, the TV 100 may further include a channel browsing processor generating a thumbnail image corresponding to a channel signal or an external input signal.

The channel browsing processor receives a stream signal TS outputted from the demodulation unit 132 or a stream signal outputted from the external device interface unit 135, and then, extracts an image from the inputted stream signal to generate a thumbnail image. The generated thumbnail image is inputted to the control unit 170 as it is or after it is encoded, or may be encoded into a stream format to be inputted to the control unit 170.

The control unit 170 may display a thumbnail list including a plurality of thumbnail images on the display unit 180 by using inputted thumbnail images, and the thumbnail images in the thumbnail list may be sequentially or simultaneously updated. Accordingly, a user may simply understand the contents of a plurality of broadcast channels.

The display unit 180 may convert the video signal, data signal, and OSD signal that are processed by the control unit 170 or the video signal and data signal that are received through the external device interface unit 135 into R, G, B signals, respectively, so as to generate driving signals.

For this, the display unit 180 may be PDP, LCD, OLED, flexible display, or 3D display, or may be configured with a touch screen to be used as both an input device and an output device.

The audio output unit 185 receives a signal sound-processed by the controller 170, for example, a stereo signal, a 3.1 channel signal, or a 5.1 channel signal, and outputs it as sound, and for this, may include various forms of speakers.

Moreover, the TV 100 may further include a capturing unit (not shown) obtaining an image of a user, and image information obtained by the capturing unit (not shown) may be inputted to the control unit 170.

In this case, the control unit 170 may sense a user's gesture by using each or a combination of an image captured by the capturing unit (not shown) and a signal detected from the sensing unit (not shown).

The power supply unit 190 supplies corresponding power throughout the TV 100. For example, the power supply unit 190 may supply power to the control unit 170, the display unit 180, and the audio output unit 185, which may be realized in the form of a system on chip (SOC).

For this, the power supply unit 190 may include a converter that converts AC power to DC power, and when the display unit 180 is implemented as a liquid crystal panel including a plurality of backlight lamps, an inverter (not shown) capable of performing a PWM operation may be further included in order for variable brightness or dimming driving.

The remote controller 200 transmits a user input to the user interface unit 150. For this, the remote controller 200 may operate through Bluetooth, RF communication, IR communication, Ultra Wideband (UWB), or ZigBee.

Additionally, the remote controller 200 receives video, audio, data signals outputted from the user input interface unit 150, and display them on the remote controller 200 or output them as sound or vibration.

The TV 100 may be a fixed type digital broadcast receiver receiving at least one of ATSC type (8-VSB type) digital broadcast, DVB-T type (COFDM type) digital broadcast, and ISDB-T type (BST-OFDM type) digital broadcast.

Moreover, the TV 100 shown in FIG. 1 is just one embodiment, and thus some of the components shown in FIG. 1 may be integrated, added, or omitted according to the specification of the actually implemented TV 100.

That is, if necessary, at least two components may be integrated into one component, or one component is divided into at least two components in order for configuration. Additionally, a function performed by each block is used for describing an embodiment of the present invention, and its specific operation or device does not limit the scope of the present invention.

According to another embodiment of the present invention, unlike those shown in FIG. 1, the TV 100 may not include the tuner 131 and the demodulation unit 132 and may receive an image through the network interface unit 133 or the external device interface unit 135 and may then play it.

For example, the TV 100 may be divided into an image processing device such a settop box for receiving broadcast signals or contents according to various networks and a contents playback device playing contents inputted from the image processing device.

In this case, a method of providing contents or setting proper for a plurality of users described below according to an embodiment of the present invention may be performed by one of the image processing device such as a separated settop box or the contents playback device including the display unit 180 and the audio output unit 185 in addition to the display device 100 described with reference to FIG. 1.

Figure 2:
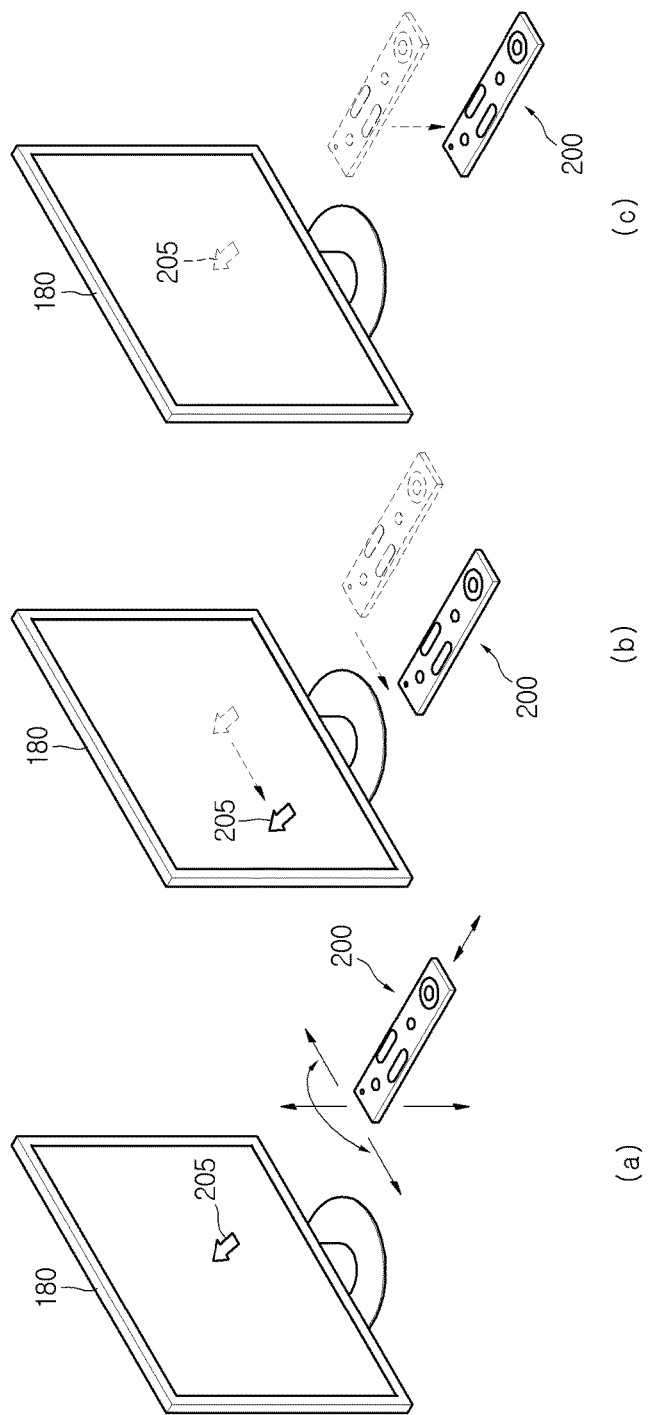
FIG. 2 is a view illustrating a method of controlling an operation of a TV through a remote controller according to an embodiment of the present invention.

FIG. 2 is a view illustrating a method of controlling an operation of a TV through a remote controller according to an embodiment of the present invention.

As shown in FIG. 2(a), a pointer 205 corresponding to a remote controller 200 is exemplarily displayed on a display unit 180.

A user may move the remote controller 200 up and down or right and left or rotate it. The pointer 205 displayed on the display unit 180 of the TV 100 corresponds to the movement of the remote controller 200. The remote controller 200 may be called a spatial remote controller because as shown in the drawing, the corresponding pointer 205 is moved and displayed according to the movement on a 3D space.

As shown in FIG. 2(b), when a user moves the remote controller 200 to the left, the pointer 205 displayed on a display unit 180 exemplarily moves to the left according to thereto.

Information on the movement of the remote controller 200 sensed through a sensor of the remote controller 200 is transmitted to the TV 100. The TV 100 may calculate the coordinates of the pointer 205 from the information on the movement of the remote controller 200. The TV 100 may display the pointer 205 in correspondence to the calculated coordinates.

As shown in FIG. 2(c), while a specific button is pressed in the remote controller 200, a user moves the remote controller 200 away from the display unit 180 exemplarily. Due to this, a selected area corresponding to the pointer 205 in the display unit 180 may be zoomed in and enlarged.

On the contrary, when a user moves the remote controller 200 close to the display unit 180, a selected area corresponding to the pointer 205 in the display unit 180 may be zoomed out and reduced.

Moreover, when the remote controller 200 is away from the display unit 180, a selected area is zoomed out, and when the remote controller 200 is closer to the display unit 180, a selected area is zoomed in.

Furthermore, while a specific button is pressed in the remote controller 200, the recognition of up and down or left and right movements may be eliminated. That is, when the remote controller 200 moves away from or closer to the display unit 180, the up, down, left, and right movements are not recognized and only the back and forth movements are recognized. While a specific button is not pressed in the remote controller 200, the pointer 205 moves only according to the up, down, left, and right movements of the remote controller 200.

Moreover, a moving speed or direction of the pointer 205 may correspond to a moving speed or direction of the remote controller 200.

Furthermore, the pointer 205 in this specification means an object displayed on the display unit 180 in correspondence to an operation of the remote controller 200. Accordingly, the besides the arrow form shown as the pointer 205, various forms of objects are available. For example, an object form may be a point, a cursor, a prompt, and a think outline. Also, the pointer 205 may be displayed in correspondence to on point of the horizontal axis and the vertical axis on the display unit 180, and also may be displayed in correspondence to a plurality of points such as a line or a surface.

Then, referring to FIG. 3, a signal transmitted to/from a server to display a multi screen by a TV will be described in more detail.

Figure 3:
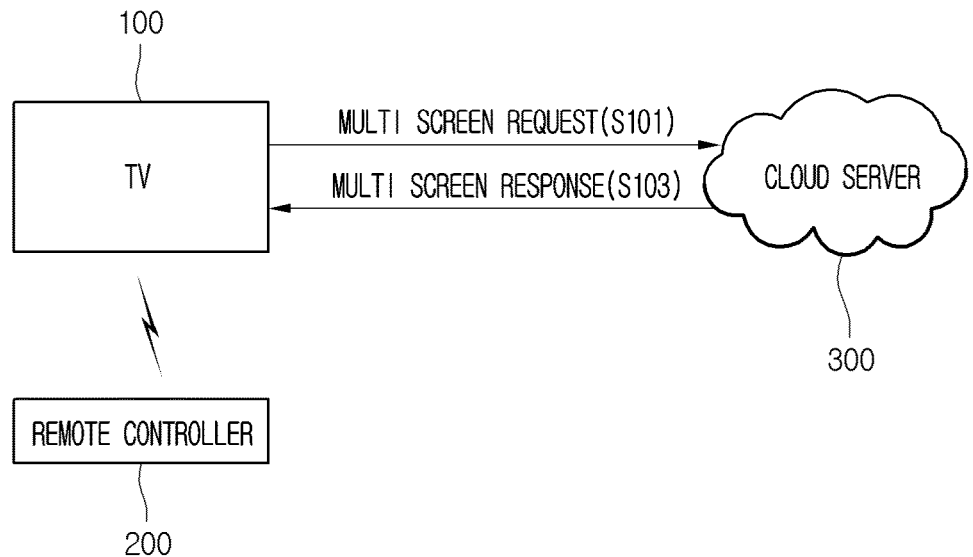
FIG. 3 is a flowchart illustrating an operating method of a TV according to an embodiment of the present invention.

FIG. 3 is a flowchart illustrating an operating method of a TV according to an embodiment of the present invention.

Referring to FIG. 3, the TV 100 transmits a multi screen request signal to a cloud server 300 according to a control of the remote controller 200 in operation S101 and receives a multi screen response signal corresponding to the multi screen request signal from the cloud server 300 in operation S103.

The TV 100 receives a user input for selecting a plurality of channels from the remote controller 200. The user input for selecting a plurality of channels may be a user input for pressing a number button or a channel change button configuring the remote controller 200. The user input for selecting a plurality of channels will be described in more detail with reference to FIGS. 5 and 6.

The multi screen request signal may vary according to whether channel information, program information, and viewing history information are stored in the cloud server 300 or the TV 100.

For example, when the channel information, the program information, and the viewing history information are stored in the cloud server 300, the TV 100 may transmit a multi screen request signal including information on the TV 100 and button information on the remote controller 200 to the cloud server 300. At this point, the cloud server 300 may extract a plurality of channel numbers from the button information on the remote controller 200 and may configure a multi screen for displaying a plurality of programs provided from a plurality of channels on one screen by using the plurality of extracted channel numbers.

Or, when the channel information, the program information, and the viewing history information are stored in the TV 100, the TV 100 may transmit to the cloud server 300 a multi screen request signal including information on the TV 100, multi screen attribute information, and channel information and program information to be respectively outputted to a plurality of multi screen configuration areas.

At this point, the cloud server 300 may configure a multi screen to display a plurality of programs provided from a plurality of channels on one screen by using the information on the TV 100, the multi screen attribute information, the channel information, and the program information. In order to display a plurality of programs on one screen, the cloud server 300 divides one screen into a plurality of multi screen configuration areas and scales the sizes thereof. At this point, the plurality of multi screen configuration areas may have a rectangular, circular, triangular, or polygonal form and are not limited thereto.

The multi screen attribute information may include information on the number of multi screen configuration areas and information on the size of each of a plurality of multi screen configuration areas but is not limited thereto.

The multi screen response signal may include multi screen information and the TV 100 may receive a multi screen response signal transmitted from the cloud server 300 through one channel. One channel that the TV 100 receives the multi screen response signal may be a dynamic channel for receiving a multi screen response signal instead of a static channel such as a broadcast channel. An operation of the TV 100 to display a multi screen by using a multi screen response signal received through one channel may be performed in a low performance terminal and may reduce the amount of data transmitted.

The multi screen information may include information on the number of multi screen configuration areas, image information and sound information outputted from each of a plurality of multi screen configuration areas, size information on each of a plurality of multi screen configuration areas, and OSD information on each of a plurality of multi screen configuration areas, and may further include any information if information relates to a multi screen output.

Then, referring to FIGS. 4 to 8, a multi screen mode entry of a TV will be described in more detail.

Figure 4:
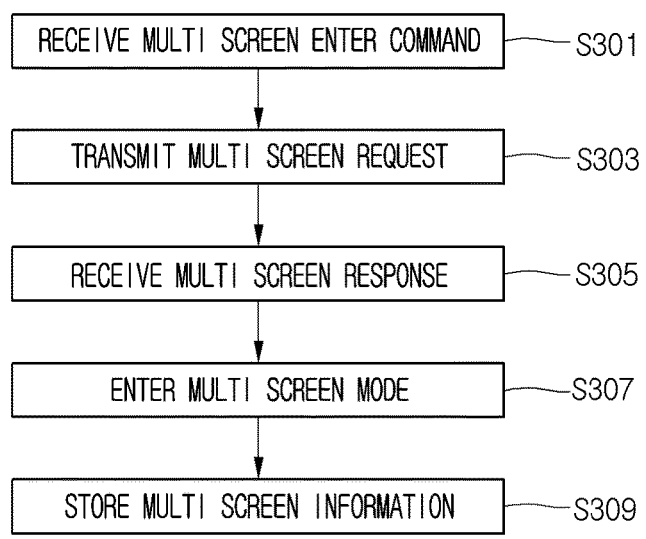
FIG. 4 is a flowchart illustrating a method of entering a multi screen mode of a TV according to an embodiment of the present invention.

FIG. 4 is a flowchart illustrating a method of entering a multi screen mode of a TV according to an embodiment of the present invention.

Referring to FIG. 4, when receiving a multi screen enter command in operation S301, the control unit 170 of the TV 100 transmits a multi screen request signal to the cloud server 300 in operation S303.

The multi screen enter command may be a user input for selecting a plurality of channels by using the remote controller 200 described with reference to FIG. 3. A user input for selecting a plurality of channels may be a user input for directly pressing a plurality of channel buttons by using the number button of the remote controller 200 and may be a user input described with reference to FIGS. 5 and 6 but is not limited thereto.

Figure 5:
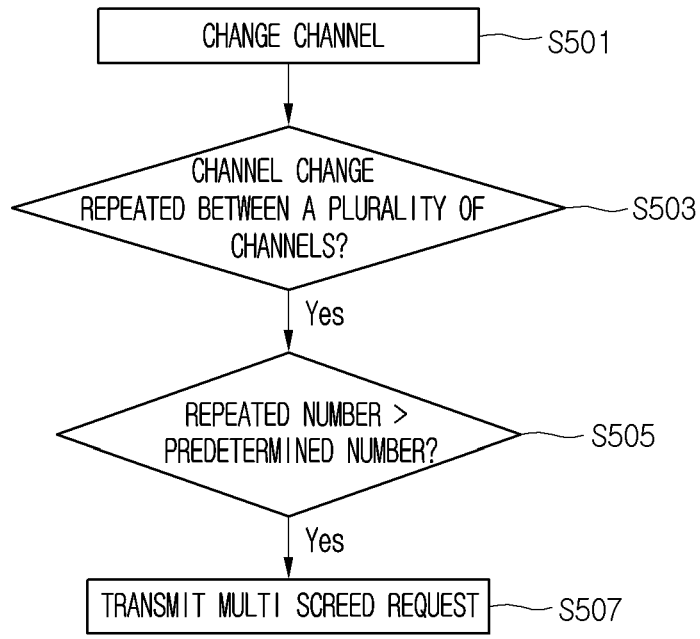
FIGS. 5 and 6 are flowcharts illustrating a method of receiving a multi screen enter command of a TV according to an embodiment of the present invention.
Figure 6:
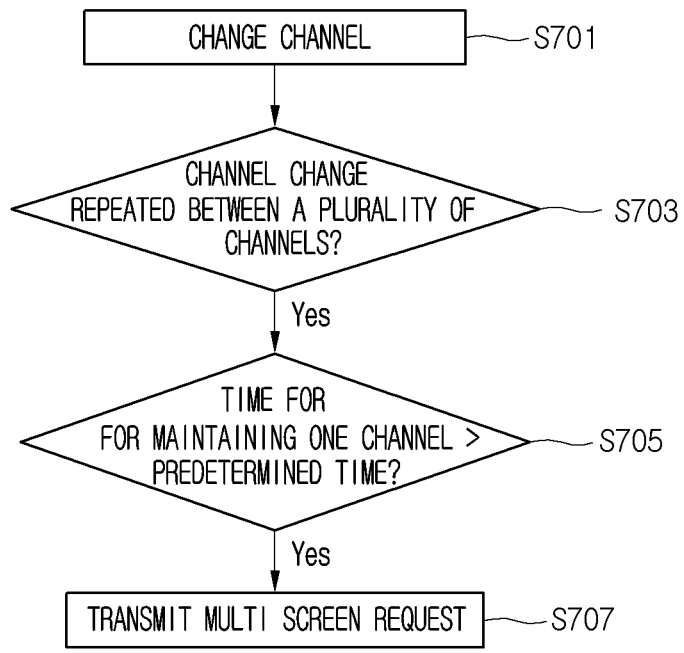

FIGS. 5 and 6 are flowcharts illustrating a method of receiving a multi screen enter command of a TV according to an embodiment of the present invention.

FIG. 5 is a flowchart illustrating a method of receiving a multi screen enter command of a TV according to an embodiment of the present invention.

Referring to FIG. 5, the control unit 170 changes a channel according to a user input in operation S501. The control unit 170 may change a channel according to a user input for pressing a channel change button of the remote controller 200, for example. That is, the channel change may mean zapping.

At this point, the control unit 170 determines whether a channel change is repeated between a plurality of channels in operation S503. For example, the control unit 170 may determine whether a user input for repeating a channel change between a channel A and a channel B is received.

When a channel change is repeated between a plurality of channels, the control unit 170 determines whether the number of channel changes exceeds a predetermined number in operation S505. The predetermined number may be determined according to a user input or an operator input or according to a viewing history but is not limited thereto.

On the basis of a determination result, if the number of channel changes exceeds the predetermined number, the control unit 170 transmits a multi screen request signal to the cloud server 300 in operation S507. For example, when a channel change between the channel A and the channel B is repeated more than five times, the control unit 170 recognizes it as a multi screen enter command and transmits a multi screen request signal to the cloud server 300, thereby adjusting an image signal and a sound signal provided through the channel A and the channel B to be outputted through a multi screen.

FIG. 6 is a flowchart illustrating a method of receiving a multi screen enter command of a TV according to another embodiment of the present invention. Hereinafter, the description for the same parts described above will be omitted.

Referring to FIG. 6, the control unit 170 changes a channel according to a user input in operation S701 and determines whether a channel change is repeated between a plurality of channels in operation S703.

When a channel change is repeated between a plurality of channels, the control unit 170 determines whether a time that at least one channel among a plurality of channels is maintained exceeds a predetermined time in operation S705.

On the basis of a determination result, if the time that at least one channel is maintained exceeds the predetermined time, the control unit 170 transmits a multi screen request signal to the cloud server 300 in operation S707. For example, when a channel change between the channel A and the channel B is repeated and the time that at least one channel is maintained is at least 5 seconds, the control unit 170 recognizes it as a multi screen enter command and transmits a multi screen request signal to the cloud server 300, thereby adjusting an image signal and a sound signal provided through the channel A and the channel B to be outputted through a multi screen.

In such a manner, a user input for selecting a plurality of channels, described with reference to FIGS. 5 and 6, may form a specific repeating pattern and the specific repeating pattern may be pre-defined according to a user input or an operator input. A multi screen enter command formed according to a predetermined repeating pattern and a multi screen according thereto may be saved as a viewing history.

Again, FIG. 4 will be described.

Then, the control unit 170 receives a multi screen response signal corresponding to a multi screen request signal from the cloud server 300 in operation S305. At this point, the control unit 170 may receive a multi screen response signal through a dynamic channel as described above. That is, the control unit 170 may receive a plurality of image signal and sound signal output screens transmitted from a plurality of channels by using one channel.

Then, the control unit 170 enters a multi screen mode according to multi screen information included in the multi screen response signal in operation S307. When entering the multi screen mode, the control unit 170 may display a screen of a dynamic channel on the display unit 180. A screen of a dynamic channel may simultaneously output a plurality of image signals and sound signals transmitted from the plurality of channels and the size of each of the plurality of image signals or sound signals may vary.

Additionally, the control unit 170 stores multi screen information in the storage unit 140. The storage unit 140 may map a plurality of dynamic channels into a plurality of multi screen information respectively corresponding to the plurality of dynamic channels and may then store them.

Moreover, in order to enter a multi screen mode, pre-stored viewing history information may be used. Hereinafter, referring to FIG. 7, a method of entering a multi screen mode by using pre-stored viewing history information will be described in more detail.

Figure 7:
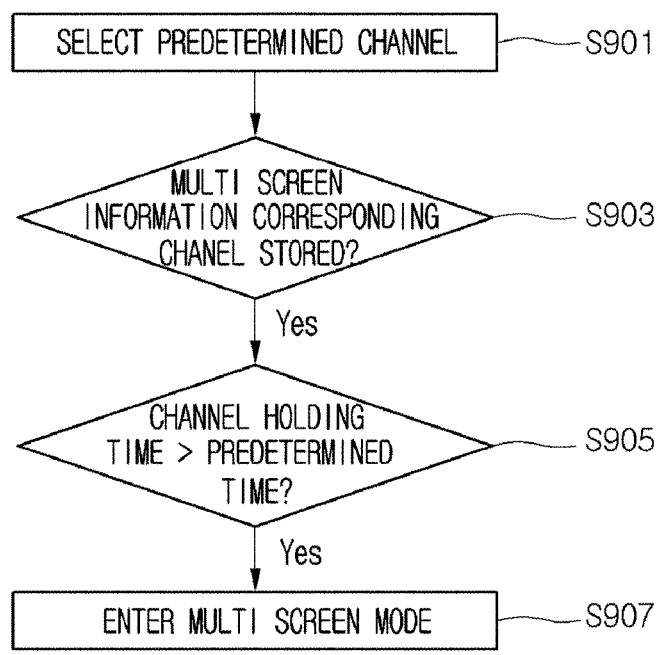
FIG. 7 is a flowchart illustrating a method of entering a multi screen mode of a TV according to an embodiment of the present invention.

FIG. 7 is a flowchart illustrating a method of entering a multi screen mode of a TV according to an embodiment of the present invention.

Referring to FIG. 7, when a predetermined channel is selected according to a user input in operation S901, the control unit 170 determines whether multi screen information corresponding to the selected channel is stored in the storage unit 140 in operation S903.

The storage unit 140, as described above, may store viewing history information such as multi screen information for each dynamic channel and one multi screen information may correspond to a plurality of channels. At this point, a plurality of channels corresponding to one multi screen information means a static channel distinguished from a dynamic channel. The control unit 170 may determine at least one among a plurality of channels corresponding to multi screen information for each dynamic channel as a predetermined channel according to a user input or an operator input.

Then, when multi screen information corresponding to a selected channel is stored in the storage unit 140, that is, viewing history information on a selected channel is stored, the control unit 170 determines whether a time that the selected channel is maintained exceeds a predetermined time in operation S905.

On the basis of a determination result, if the time that the selected channel is maintained exceeds the predetermined time, the control unit 170 enters a multi screen mode according to multi screen information corresponding to the selected channel in operation S907. That is, the control unit 170 may recognize a user input corresponding to viewing history information stored in the storage unit 140 as a multi screen enter command and may then enter a multi screen mode by using the viewing history information.

Although not shown in the drawing, the control unit 170 may enter the multi screen mode and may then display a first multi screen on the display unit 180. The first multi screen means a screen corresponding to viewing history information pre-stored in the storage unit 140.

While displaying the first multi screen, the control unit 170 may receive a user input for selecting a plurality of channels forming a specific repeating pattern. At this point, when a user input for selecting a plurality of channels received during the first multi screen display is different from a plurality of channels corresponding to multi screen information for the first multi screen display, the control unit 170 may transmit the multi screen request signal, described with reference to FIGS. 5 and 6, to the cloud server 300.

In such a way, when the viewing history information is stored in the TV 100, the control unit 170 extracts multi screen information from the stored viewing history information and when the viewing history information is not stored in the TV 100, the control unit 170 requests new multi screen information from the cloud server 300. Therefore, multi screen display may be performed more efficiently.

Hereinafter, referring to FIG. 8, a method of entering a multi screen mode through multi screen mode viewing recommendation will be described in more detail.

Figure 8:
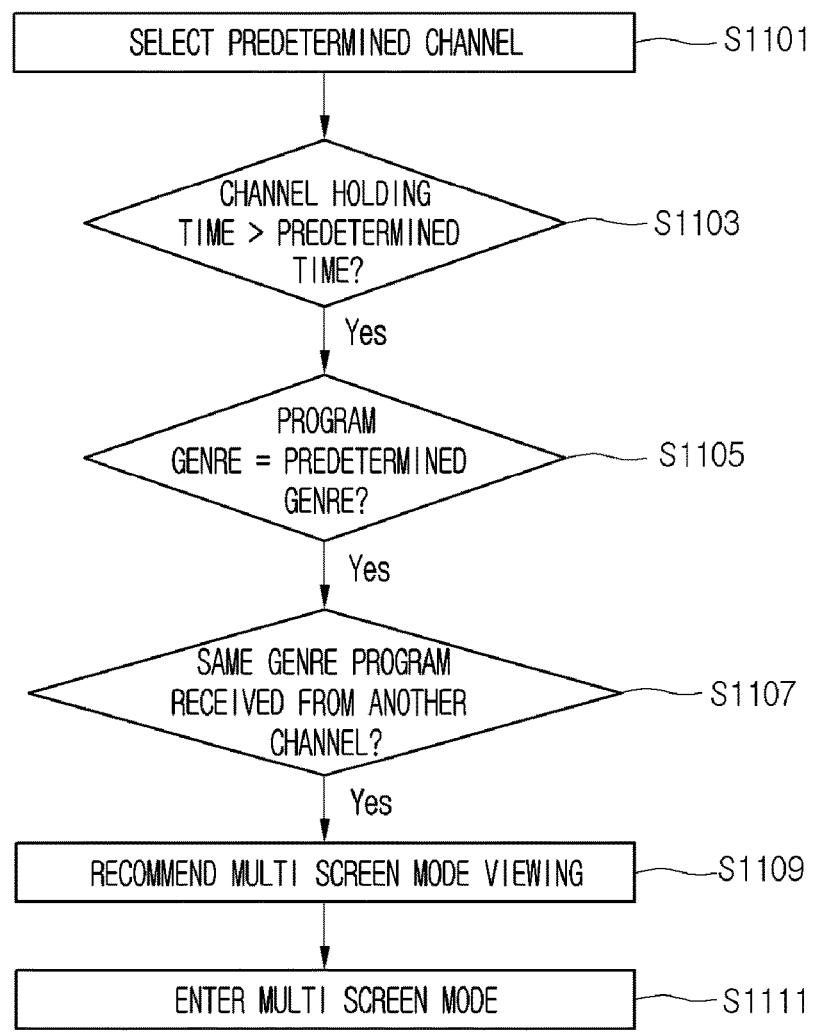
FIG. 8 is a flowchart illustrating a method of entering a multi screen mode of a TV according to an embodiment of the present invention.

FIG. 8 is a flowchart illustrating a method of entering a multi screen mode of a TV according to an embodiment of the present invention.

Referring to FIG. 8, when a predetermined channel is selected according to a user input in operation S1101, the control unit 170 determines whether a time that the selected channel is maintained exceeds a predetermined time in operation S1103.

For example, the control unit 170 may determine a channel A, that is, a sports channel, as a predetermined channel according to a user input.

Then, if the holding time for the selected channel exceeds a predetermined time, the control unit 170 determines whether a program genre provided from the selected channel corresponds to a predetermined genre in operation S1105. For example, the predetermined program genre may be sports.

Then, when the program genre provided from the selected channel corresponds to the predetermined genre, the control unit 170 determines whether a program having the same genre as the program provided from the selected channel is received from other channels other than the selected channel in operation S1107. For example, the control unit 170 may determine whether there is a channel providing a sports program when the channel A is selected.

When there is a channel providing a program having the same genre as the program provided from the selected channel, the control unit 170 displays a multi screen mode viewing recommendation on the display unit 180 in operation S1109. For example, the control unit 170 may display on the display unit 180 information for recommending a user to view channels B, C, and D providing sports programs together with the channel A in a multi screen mode.

Moreover, although not shown in the drawings, when there is a channel providing a program that relates to the program provided from the selected channel, the control unit 170 displays a multi screen mode viewing recommendation on the display unit 180.

Then, the control unit 170 enters a multi screen mode according to a user input in operation S1111. At this point, in order to enter a multi screen mode, the control unit 170 may enter the multi screen mode through operation S303 and operation S305 described above with reference to FIG. 4.

Then, referring to FIGS. 9 to 11, an image outputted from a multi screen mode will be described in more detail.

FIG. 9 is a view illustrating a multi screen where a size change of a configuration area is available according to an embodiment of the present invention.

Referring to FIG. 9A, the control unit 170 may display a multi screen including a first configuration area 11, a second configuration area 12, a third configuration area 13, and a fourth configuration area 14, on the display unit 180 in a multi screen mode. The number of configuration areas is not limited to four and may be at least two.

The size of each of a plurality of configuration areas configuring a multi screen may be identical to each other as shown in FIG. 9A or may be different from each other as shown in FIGS. 9B and 9C.

Referring to FIG. 9B, the multi screen includes the largest first configuration area 11, a second configuration area 12 and a third configuration area 13, which are smaller than the first configuration area 11 and larger than a fourth configuration area 14, and the smallest fourth configuration area 14.

At this point, the largest first configuration area 11 may mean a main screen. According to a user input or an operator input, the control unit 170 may output a program provided from an entry channel, a program provided from a favorite, or a favorite program, to a main screen of the multi screen.

The entry channel may mean a channel selected in operation S901 of FIG. 7 or a channel selected in operation S1101 of FIG. 8.

The favorite channel may mean a channel having the highest priority determined by a user among a plurality of channels corresponding to multi screen information on the basis of viewing history information. For example, the favorite channel may be the channel that a user views most or a channel that a user registers as a favorite channel among a plurality of channels corresponding to multi screen information but is not limited thereto.

The favorite program may mean the program having the highest priority determined by a user among programs provided from a plurality of channels corresponding to multi screen information on the basis of viewing history information. For example, the favorite program may be the program that a user views most or a program that a user registers as a favorite program among programs provided from a plurality of channels corresponding to multi screen information but is not limited thereto.

The control unit 170 may determine a priority between an entry channel, a favorite channel, and a favorite program according to a user input or an operator input. For example, when it is determined in advance that a favorite channel has a higher priority than an entry channel and a favorite program, even if the entry channel is a channel B, the control unit 170 may output to a main screen a program provided from a channel A, that is, a favorite channel, among the channel A, the channel B, a channel C, and a channel D corresponding to multi screen information.

Or, the control unit 170 may determine a channel and a program outputted from a plurality of configuration areas of a multi screen on the basis of viewing history information.

Figure 10:
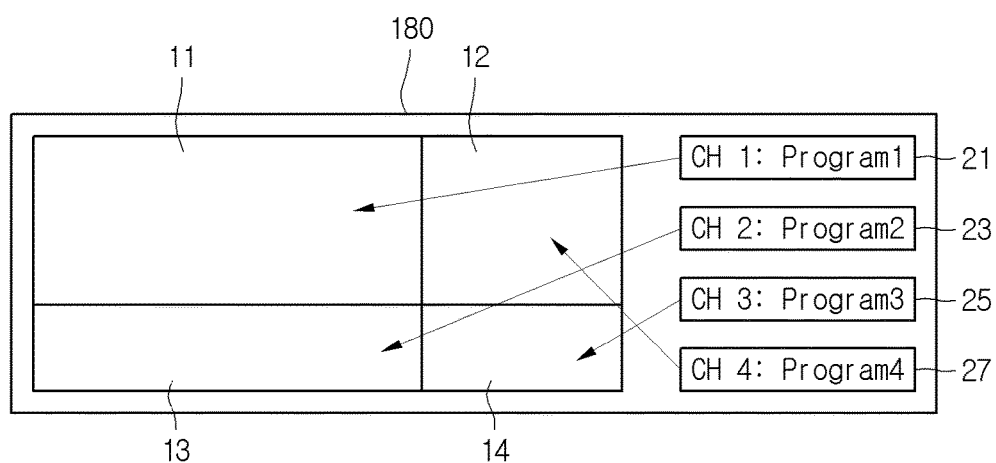
FIG. 10 is a view illustrating a multi screen where an output program control for each area is available according to an embodiment of the present invention.

FIG. 10 is a view illustrating a multi screen where an output program control for each area is available according to an embodiment of the present invention.

Referring to FIG. 10, the TV 100 may display a multi screen and a program indicator for each channel in order to provide a user interface for controlling an output program for each area of a multi screen.

For example, according to a predetermined arrangement criteria of the cloud server 300, a multi screen displayed on the TV 100 may include a first configuration area 11 outputting a first program Program1 provided from a first channel CH1, a second configuration area 12 outputting a second program Program2 provided from a second channel CH2, a third configuration area 13 outputting a third program Program3 provided from a third channel CH3, and a fourth configuration area 14 outputting a fourth program Program4 provided from a fourth channel CH4.

At this point, the TV 100 may display around the multi screen a first indicator 21 indicating the first program Program1 outputted from the first configuration area 11, a second indicator 23 indicating the second program Program2 outputted from the second configuration area 12, a third indicator 25 indicating the third program Program3 outputted from the third configuration area 13, and a fourth indicator 27 indicating the fourth program Program4 outputted from the fourth configuration area 14.

Then, the control unit 170 may output the first program Program1 in the first configuration area 11 according to a first user input for selecting the first indicator 21 and then dragging and dropping the selected first indicator 21 to the first configuration area 11 by using the remote controller 200. Or, the control unit 170 may output the second program Program2 in the third configuration area 13 according to a second user input for selecting the second indicator 23 and then dragging and dropping the selected second indicator 23 to the third configuration area 13 by using the remote controller 200. Or, the control unit 170 may output the third program Program3 in the fourth configuration area 14 according to a third user input for selecting the third indicator 25 and then dragging and dropping the selected third indicator 25 to the fourth configuration area 14 by using the remote controller 200. Or, the control unit 170 may output the fourth program Program4 in the second configuration area 12 according to a fourth user input for selecting the fourth indicator 27 and then dragging and dropping the selected fourth indicator 27 to the second configuration area 12 by using the remote controller 200.

Or, although not shown in the drawing, the control unit 170 may change a plurality of programs respectively outputted from a plurality of multi screen configuration areas by directly receiving a user input on a multi screen and may change a plurality of programs respectively outputted from a plurality of multi screen configuration areas by receiving a user input on an EPG described with reference to FIG. 15. However, the present invention is not limited thereto.

Figure 11:
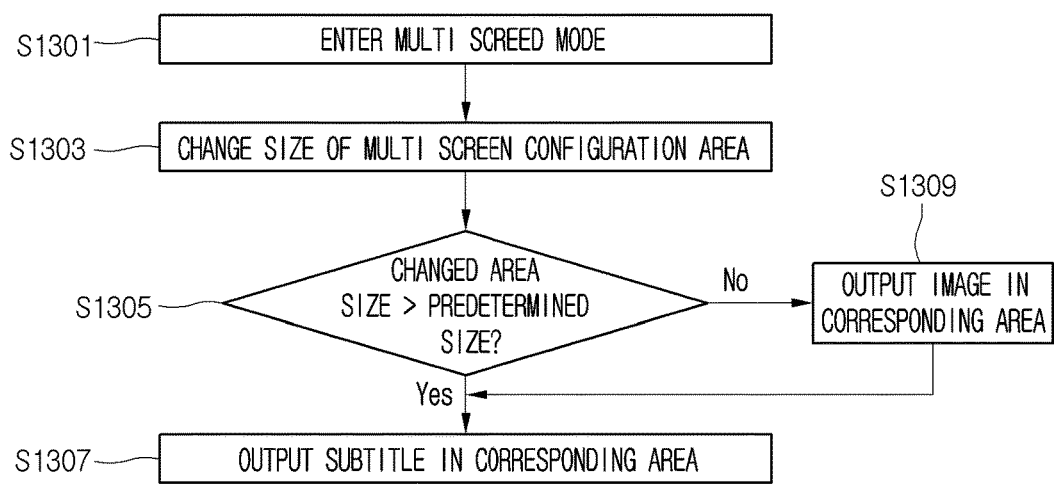
FIG. 11 is a flowchart illustrating a method of changing a multi screen property of a TV according to an embodiment of the present invention.

FIG. 11 is a flowchart illustrating a method of changing a multi screen property of a TV according to an embodiment of the present invention.

Referring to FIG. 11, after entering a multi screen mode in operation S1301, the control unit 170 changes the size of a multi screen configuration area according to a user input in operation S1303.

For example, the control unit 170 may change the position of a vertical line or a horizontal line in a multi screen shown in FIG. 9A according to a user input transmitted from the remote controller 200. Herein, the vertical line shown in FIG. 9A means a boundary dividing the first configuration area 11 and the third configuration area 13 to obtain the second configuration area 12 and the fourth configuration area 14 and the horizontal line shown in FIG. 9B means a boundary dividing the first configuration area 11 and the second configuration area 12 to obtain the third configuration area 13 and the fourth configuration area 14.

For example, the control unit 170 may gradually enlarge the sizes of the first configuration area 11 and the third configuration area 13 and may gradually reduce the sizes of the second configuration area 12 and the fourth configuration area 14 according to a user input for selecting the vertical line shown in FIG. 9A and then dragging and dropping the selected vertical line to the right direction by using the remote controller 200.

Or, the control unit 170 may gradually enlarge the sizes of the first configuration area 11 and the second configuration area 12 and may gradually reduce the sizes of the third configuration area 12 and the fourth configuration area 14 according to a user input for selecting the horizontal line shown in FIG. 9A and then dragging and dropping the selected horizontal line to the bottom direction by using the remote controller 200.

Moreover, the control unit 170 may transmit a size change request signal of a multi screen configuration area according to a user input to the cloud server 300.

Again, FIG. 11 is described.

Then, the control unit 170 determines whether the size of a changed multi screen configuration area is smaller than a predetermined size in operation S1305.

On the basis of a determination result, when the size of a changed multi screen configuration area is smaller than the predetermined size, the control unit 170 outputs a subtitle in a corresponding multi screen configuration area in operation S1307 and when the size of a changed multi screen configuration area is larger than the predetermined size, the control unit 170 outputs an image in a corresponding multi screen configuration area in operation S1309.

For example, as comparing the multi screen shown in FIG. 9A and the multi screen shown in FIG. 9B, since the enlarged first configuration area 11 and the reduced second configuration area 12 and third configuration area 13 are larger than a predetermined size, an image signal of a corresponding program may be outputted to a corresponding area. However, since the reduced fourth configuration area 14 is smaller than the predetermined size, only a subtitle signal of a corresponding program may be outputted to a corresponding area.

For another example, as comparing the multi screen shown in FIG. 9B and the multi screen shown in FIG. 9C, since the enlarged first configuration area 11 and second configuration area 12 are larger than the predetermined size, an image signal of a corresponding program may be outputted to a corresponding area. However, since the reduced third configuration area 13 and fourth configuration area 14 are smaller than the predetermined size, only a subtitle signal of a corresponding program may be outputted to a corresponding area.

Although not shown in the drawing, the control unit 170 may gradually reduce the sizes of the third configuration area 13 and the fourth configuration area 14 according to a user input for selecting the horizontal line shown in FIG. 9C and then dragging and dropping the selected horizontal line to the bottom direction by using the remote controller 200. When the sizes of the third configuration area 13 and the fourth configuration area 14 become smaller than a predetermined minimum size, the third configuration area 13 and the fourth configuration area 14 are deleted and only the first configuration area 11 and the second configuration area 12 configure a multi screen.

Moreover, the control unit 170 may receive a size change response signal of a multi screen configuration area corresponding to the size change request signal of the multi screen configuration area from the cloud server 300. The size change response signal of the multi screen configuration area may include changed multi screen information. The changed multi screen information may include at least one of information on the changed number of multi screen configuration areas, changed image information, subtitle information, and sound information outputted from each of a plurality of multi screen configuration areas, changed size information on each of a plurality of multi screen configuration areas, and changed OSD information on each of a plurality of multi screen configuration areas.

Then, referring to FIGS. 12 to 14, a sound outputted from a multi screen mode will be described in more detail.

Figure 12:
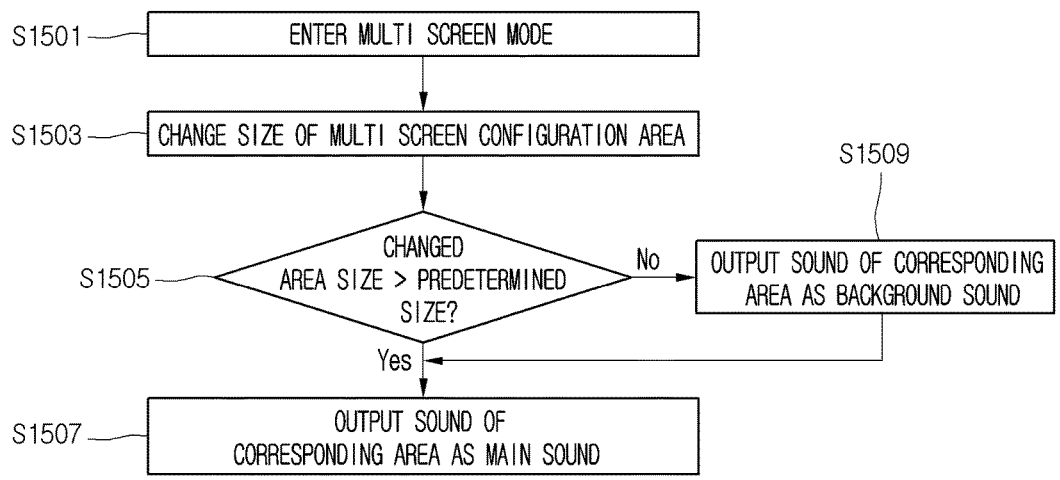
FIG. 12 is a flowchart illustrating a method of controlling a multi screen output sound of a TV according to an embodiment of the present invention.

FIG. 12 is a flowchart illustrating a method of controlling a multi screen output sound of a TV according to an embodiment of the present invention.

Figure 13:
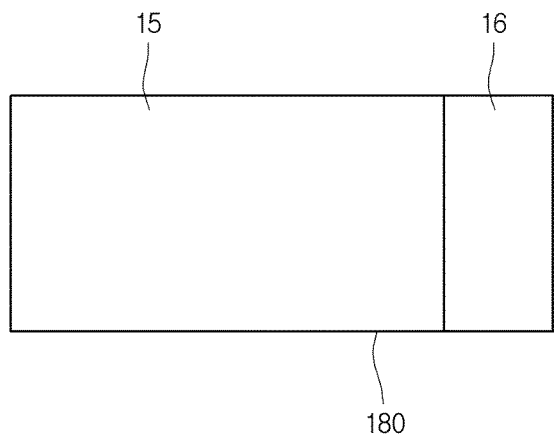
FIG. 13 is a view illustrating a method of controlling a multi screen output sound of a TV according to an embodiment of the present invention.

FIG. 13 is a view illustrating a method of controlling a multi screen output sound of a TV according to an embodiment of the present invention.

Referring to FIG. 12, after entering a multi screen mode in operation S1501, the control unit 170 changes the size of a multi screen configuration area according to a user input in operation S1503.

For example, the control unit 170 may change the position of a vertical line in a multi screen shown in FIG. 13 according to a user input transmitted through the remote controller 200. Herein the vertical line shown in FIG. 13 means a boundary dividing a screen of the display unit 180 into a left area 15 and a right area 16.

For example, the control unit 170 may gradually enlarges the sizes of the left area 15 and may then gradually reduces the size of the right area 16 according to a user input for selecting the vertical line in the multi screen shown in FIG. 13 and then dragging and dropping the selected vertical line to the right direction by using the remote controller 200.

Moreover, the control unit 170 may transmit a size change request signal of a multi screen configuration area according to a user input to the cloud server 300.

Again, FIG. 12 will be described.

Then, the control unit 170 determines whether the size of a changed multi screen configuration area is greater than a predetermined size in operation S1505.

On the basis of a determination result, when the size of a changed multi screen configuration area is larger than the predetermined size, the control unit 170 outputs a sound signal of a program provided from a corresponding multi screen configuration area as a main sound signal in operation S1507 and when the size of a changed multi screen configuration area is smaller than the predetermined size, the control unit 170 outputs a sound signal of a program provided from a corresponding multi screen configuration area as a background sound signal in operation S1509.

Or, although not shown in the drawing, by comparing each changed size of a plurality of multi screen configuration areas, the control unit 170 may output a sound signal of a program provided from the larger multi screen configuration area as a main sound signal and may output a sound signal of a program provided from the smaller multi screen configuration area as a background sound signal. But the present invention is not limited thereto.

For example, in the multi screen shown in FIG. 13, since the enlarged left area 15 is larger than the predetermined size, a sound signal of a program corresponding to the left area 15 may be outputted as a main sound signal and since the reduced right area 16 is smaller than the predetermined size, a sound signal of a program corresponding to the right area 16 may be outputted only as a background sound signal.

For example, a user enlarges the size of the left area 15 outputting a news program to be larger than the predetermined size and reduces the size of the right area 16 outputting a music program to be smaller than the predetermined size according to a user input transmitted through the remote controller 200, thereby outputting the sound of the news program as main sound and outputting the sound of the music program as background sound. Herein, the volume of the main sound may be adjusted more loudly by a predetermined multiple than that of the background sound.

Or, although not shown in the drawing, when the audio output unit 185 is a stereo type, the control unit 170 outputs a sound signal of a program corresponding to the left area 15 to a left audio output unit and outputs a sound signal of a program corresponding to the right area 16 of FIG. 13 to a right audio output unit in a multi screen mode.

Additionally, the control unit 170 may change the size of a sound signal of a program corresponding to a multi screen configuration area to be proportional to the size of the multi screen configuration area.

For example, by comparing each size of a plurality of multi screen configuration areas shown in FIG. 13, the control unit 170 may output the volume of a program sound signal provided from the larger left area 15 to be louder than the volume of a program sound signal provided from the smaller right area 15. However, the present invention is not limited thereto. As a result, the control unit 170 may adjust the volume of a sound signal outputted from a left audio output unit to be louder than the volume of a sound signal outputted from a right audio output unit.

Moreover, the control unit 170 may receive a sound volume change response signal of a multi screen configuration area corresponding to a sound volume change request signal of the multi screen configuration area from the cloud server 300. The sound volume change response signal of the multi screen configuration area may include changed sound information outputted from each of a plurality of multi screen configuration areas.

However, the sound synthesis in which a volume outputted from the left audio output unit and a volume outputted from the right audio output unit in the stereo type audio output unit 185 are different from each other may be performed in the control unit 170 or the cloud server 300.

Additionally, the control unit 170 may output a main sound signal according to the above-described method but may output a background signal after receiving it through the cloud server 300 or the external device interface unit 135 unlike the above-described method. However, the present invention is not limited thereto.

Figures 14, 15:
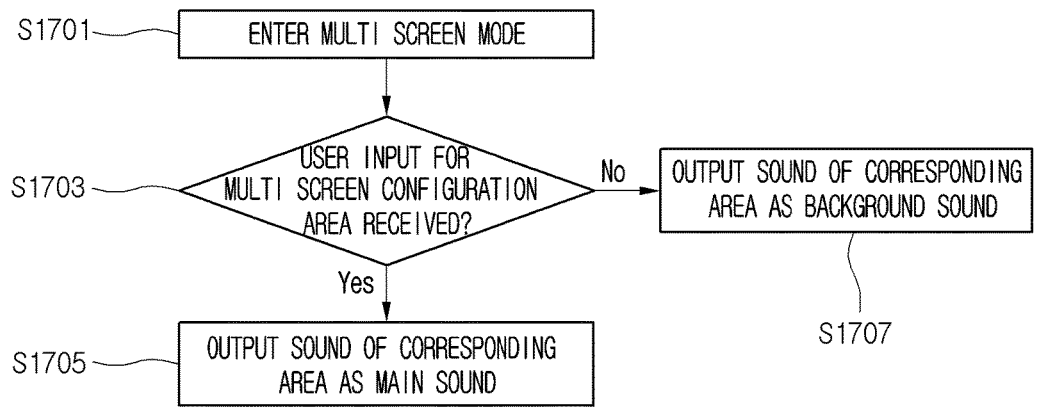
FIG. 14 is a flowchart illustrating a method of controlling a multi screen output sound of a TV according to an embodiment of the present invention.
FIG. 15 is a view illustrating an EPG of a TV according to an embodiment of the present invention.

FIG. 14 is a flowchart illustrating a method of controlling a multi screen output sound of a TV according to an embodiment of the present invention.

Referring to FIG. 14, after entering a multi screen mode in operation S1701, the control unit 170 determines whether a user input on a multi screen configuration area is received in operation S1703.

Once entering the multi screen mode, the control unit 170 may perform a control to output only a sound signal of a program provided from a favorite channel through the audio output unit 185, for example.

Or, the control unit 170 outputs a sound signal of a program corresponding to the largest first configuration area 11 shown in FIG. 9C through the audio output unit 185 and outputs a sound signal of a program corresponding to the second configuration area 12 smaller than the first configuration area to an external output device through the external device interface unit 135. At this point, the control unit 170 may output to a predetermined area of the display unit 180 the subtitle signals of programs that respectively correspond to the third configuration area 13 and the fourth configuration area 14, which are respectively smaller than the first configuration area 11 and the second configuration area 12. The predetermined area may be part of each internal area of the third configuration area 13 and the fourth configuration area 14 or may be part or each external area of the third configuration area 13 and the fourth configuration area 14. When the predetermined area is an external area, the subtitle of a program corresponding to the third configuration area 13 and the subtitle of a program corresponding to the fourth configuration area 14 may be displayed distinctively by using colors.

A user input for a multi screen configuration area may be a selective input for a corresponding multi screen configuration area transmitted through the remote controller 200 but is not limited thereto.

Again, FIG. 14 will be described.

The control unit 170 outputs a sound of a multi screen configuration area selected by a user through the remote controller 200 as main sound in operation S1705 and outputs a sound of a multi screen configuration area not selected by the user as background sound in operation S1707.

Then, a multi screen indicator provided from Electronic Program Guide (EPG) will be described with reference to FIG. 15.

FIG. 15 is a view illustrating an EPG of a TV according to an embodiment of the present invention.

Referring to FIG. 15, the EPG 30 may provide channel information for each hour. For example, the EPG 30 may provide identification information 41, 51, 61, 52, 71, 42, 53, and 54 on programs provided from first to eight channels CH1, CH2, CH3, CH4, CH5, CH6, CH7, and CH8 at 11:00 AM Saturday.

At this point, the EPG 30 may divide a plurality of programs provided from the same multi screen into a plurality of programs provided from another multi screen and a plurality of programs not provided for a multi screen and may then display them distinctively.

For example, first multi screen indicators 91 provided from the EPG 30 may be displayed as icons in a plurality of program identification information 51, 52, 53, and 54 provided from a first multi screen.

Here, the first multi screen indicator 91 may indicate a first multi screen outputting different four program signals simultaneously.

At this point, the control unit 170 may display the first multi screen through a first dynamic channel according to a user input for selecting the first multi screen indicator 91.

At this point, the control unit 170 may output a sound signal provided from a program including the first multi screen indicator 91 selected according to a user input alone or as main sound signal but is not limited thereto. For example, when receiving a user input for selecting the first multi screen indicator 91 displayed in baseball (M:P) program identification information, the control unit 170 may output a sound signal provided from a baseball (M:P) program alone or as main sound signal.

Or, the control unit 170 may display information on a plurality of programs provided from a first multi screen through a pop-op window according to a user input for selecting the first multi screen indicator 91.

Or, the control unit 170 may display information on a plurality of programs provided from a first multi screen through a pop-op window according to a user input for selecting an information key button of the remote controller 200.

For another example, second multi screen indicators 93 provided from the EPG 30 may be displayed as icons in a plurality of program identification information 41 and 42 provided from a second multi screen. Here, the second multi screen indicator 93 may indicate a second multi screen outputting different two program signals simultaneously.

At this point, the control unit 170 may display the second multi screen through a second dynamic channel according to a user input for selecting the second multi screen indicator 93.

At this point, the control unit 170 may output a sound signal provided from a program including the second multi screen indicator 93 selected according to a user input alone or as main sound signal but is not limited thereto. For example, when receiving a user input for selecting the second multi screen indicator 93 displayed in newsD identification information, the control unit 170 may output a sound signal provided from a newsD program alone or as main sound signal.

Or, the control unit 170 may display information on a plurality of programs provided from a second multi screen through a pop-op window according to a user input for selecting the second multi screen indicator 93.

Or, the control unit 170 may display information on a plurality of programs provided from a second multi screen through a pop-op window according to a user input for selecting an information key button of the remote controller 200.

Moreover, although not shown in the drawing, the EPG may display at least one multi screen indicator and also viewing history information on a plurality of users for a corresponding program, as icons in the plurality of program identification information 51, 52, 53, and 54. At this point, the viewing history information on a plurality of users may also display identification information on a plurality of users.

Additionally, the control unit 170 may perform simultaneous reservation viewing or simultaneous reservation recording on a plurality of programs corresponding to one multi screen by using the EPG 30. In order to perform simultaneous reservation viewing, the control unit 170 may simultaneously output a plurality of programs on one multi screen and in order to perform simultaneous reservation recording, the control unit 170 may record one multi screen output where a plurality of programs are outputted simultaneously while recording each output of the plurality of programs.

Moreover, although not shown in the drawing, as providing a user interface for an output program control for each area of a multi screen described with reference to FIG. 10, the control unit 170 may display a multi screen and the EPG 30 on the display unit 180.

Accordingly, the control unit 170 may output the baseball (M:P) program in the first configuration area 11 according to a user input for selecting the first multi screen indicator 91 displayed in the baseball (M:P) program identification information 53 and then dragging and dropping the selected first multi screen indicator 91 to the first configuration area 11 by using the remote controller 200.

Then, a multi screen mode of a TV, in which an output of a main screen, that is, one component of a multi screen, is changed by using voice recognition as input, will be described in more detail with reference to FIG. 16.

Figure 16:
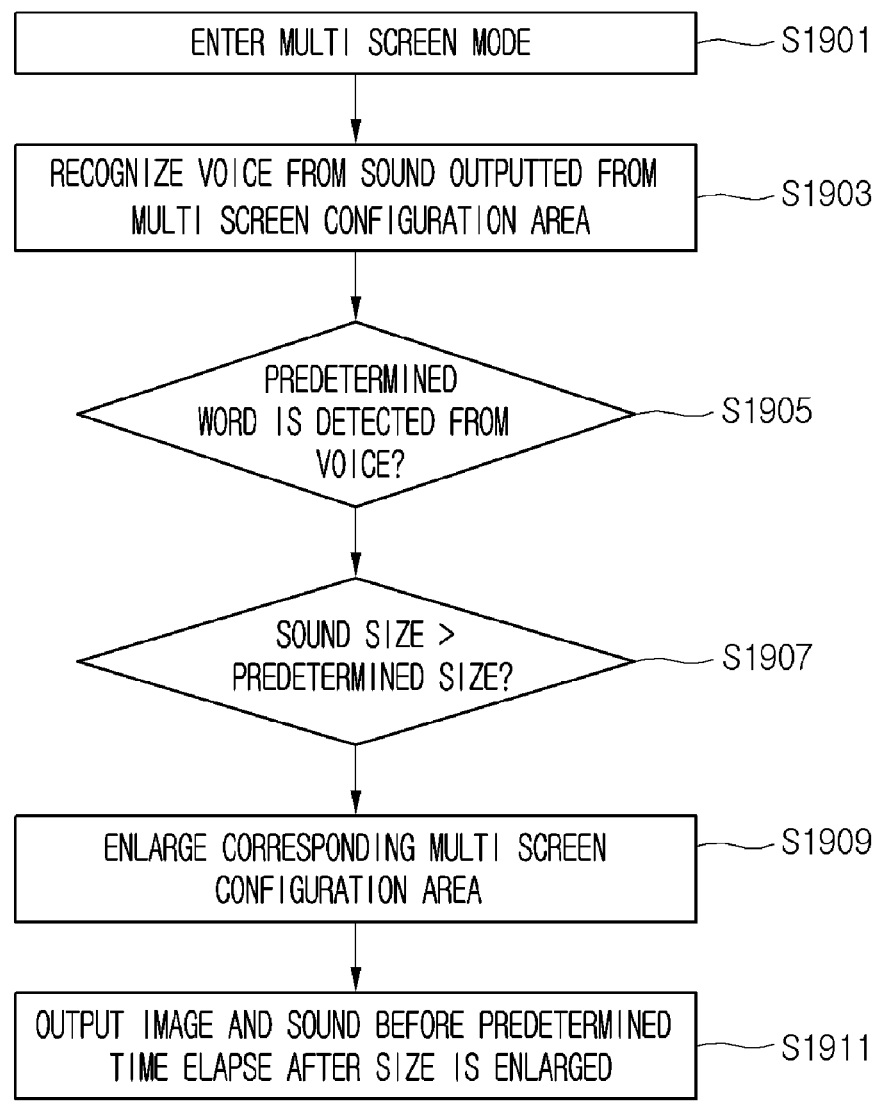
FIG. 16 is a view illustrating a method of changing a multi screen configuration of a TV according to an embodiment of the present invention.

FIG. 16 is a view illustrating a method of changing a multi screen configuration of a TV according to an embodiment of the present invention.

Referring to FIG. 16, after entering a multi screen mode in operation S1901, the control unit 170 recognizes voice from a sound outputted from a multi screen configuration area in operation S1903.

The control unit 170 may extract a voice signal from a sound signal of a program provided from each of a plurality of multi screen configuration areas and may then perform voice recognition.

Then, the control unit 170 determines whether a predetermined word is detected from the recognized voice in operation S1905. The predetermined word may be determined by a user in advance. For example, a user may input a word such as "goal" or "homerun" or the name of a baseball player into the TV 100 in advance as a trigger word.

Then, the control unit 170 determines whether the volume size of a sound signal exceeds a predetermined size in operation S1907. For example, the control unit 170 may determine whether the volume of a sound signal of a program provided from each of a plurality of multi screen configuration areas exceeds about 100 dB.

When a predetermined word is detected from a sound signal of a program provided from each of a plurality of multi screen configuration areas and the volume of a voice signal including the predetermined word exceeds a predetermined size, the control unit 170 enlarges a multi screen configuration area where the voice signal is outputted in operation S1909. At this point, the control unit 170 may output a multi screen configuration area where voice signal is outputted, to a main screen or a full screen.

At this point, when corresponding to one of operation S1905 or operation S1907, the control unit 170 may enlarge a corresponding multi screen configuration area. That is, when a predetermined word is detected from a sound signal of a program provided from each of a plurality of multi screen configuration areas or the volume of a sound signal of a program provided from each of a plurality of multi screen configuration areas exceeds a predetermined size, the control unit 170 enlarges a multi screen configuration area where voice signal is outputted.

For example, when a voice signal including a predetermined word is detected from a sound signal of a program outputted from the first configuration area 11 configuring the multi screen shown in FIG. 9A or the volume of a sound signal of a program outputted from the first configuration area 11 is detected larger than a predetermined size, as shown in FIG. 9B or FIG. 9C, the control unit 170 may enlarge the size of the first configuration area 11.

Then, the control unit 170 outputs image and sound before a predetermined time elapses after the size is enlarged in operation S1911. As outputting a program corresponding to a corresponding multi screen configuration area while enlarging the corresponding multi screen configuration area, the control unit may output image and sound of a program, which are time-shifted by a predetermined time.

Through this, when viewing a baseball program through a multi screen, a user may view a crucial scene or a highlight scene of a baseball game with a larger screen and also may view image and hear sound before a crucial scene or a highlight scene starts. At this point, in order to detect a crucial scene or a highlight scene, various detection methods according to a user input may be used besides the above-described method of detecting a trigger word or a sound level that exceeds a predetermined size.

Moreover, a trigger word or a sound level that exceeds a predetermined size may be detected from a sound signal of a program outputted from the above-described multi screen configuration or may be detected from a broadcast screen outputted on a screen as soon as a corresponding program is outputted.

Or, if there is a social networking service (SNS) screen or a chatting screen outputted on a screen as soon as a corresponding program is outputted, a trigger word in text format may be detected from the SNS screen or the chatting screen.

According to an embodiment of the present invention, a TV provides various forms of a multi screen through one channel, thereby improving user's convenience.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An operating method of a TV, the method comprising:
   receiving, by the TV, a multi screen enter command according to a user input;
   transmitting, by the TV, a multi screen request signal to a cloud server in response to the multi screen enter command;
   receiving, by the TV, a multi screen response signal including multi screen information transmitted from the cloud server via one channel;
   entering, by the TV, a multi screen mode according to the multi screen information included in the multi screen response signal; storing, by the TV, the multi screen information; and
   displaying, by the TV, a multi screen including a plurality of multi screen configuration areas,
   wherein the cloud server divides one screen into the plurality of multi screen configuration areas and scales sizes of the multi screen configuration areas in order to display a plurality of programs on the one screen, and
   wherein the receiving of the multi screen enter command comprises:
   performing a channel change according to the user input;
   determining whether the channel change is repeated between a plurality of channels;
   determining whether a time that at least one channel among the plurality of channels is maintained exceeds a predetermined time when the channel change is repeated between the plurality of channels; and
   recognizing a case that the at least one channel among the plurality of channels is maintained exceeds the predetermined time as the multi screen enter command.

2. The method according to claim 1, wherein the multi screen information comprises at least one of:
   information on a number of multi screen configuration areas configuring the one screen, size information on each of the plurality of multi screen configuration areas, and program information outputted from each of the plurality of multi screen configuration areas.

3. The method according to claim 2, wherein the receiving of the multi screen enter command further comprises:

determining whether a number of channel changes exceeds a predetermined number when the channel change is repeated between the plurality of channels; and recognizing a case that the number of channel changes exceeds the predetermined number as the multi screen enter command.

4. The method according to claim 2, wherein the multi screen request signal comprises at least one of:

TV information, information on the plurality of channels, information on the plurality of programs provided through the plurality of channels, information on the number of multi screen configuration areas configuring the one screen, and size information on each of the plurality of multi screen configuration areas.

5. The method according to claim 2, wherein the program information outputted from each of the plurality of multi screen configuration areas comprises at least one of:

image information, sound information, and subtitle information on each of the plurality of programs provided through the plurality of programs.

6. The method according to claim 2, wherein the program information outputted from each of the plurality of multi screen configuration areas corresponds to information on the plurality of programs that the cloud server receives through a plurality of static channels, and wherein the first channel corresponds to a dynamic channel that the TV generates to receive the multi screen response signal from the cloud server.

7. The method according to claim 1, wherein the multi screen request signal comprises information on a plurality of channel numbers.

8. The method according to claim 1, wherein the multi screen enter command corresponds to a user input for selecting the plurality of channels.

9. A TV allocating a dynamic channel to receive multi screen information transmitted from a cloud server, the TV comprising:

a display unit displaying a multi screen;

a user interface unit receiving a user input for channel selection;

a tuner receiving a broadcast signal corresponding to a broadcast channel selected according to a user input;

a demodulation unit demodulating a broadcast signal received through the tuner and decoding the broadcast channel to output a stream signal;

a network interface unit receiving the multi screen information from the cloud server;

a storage unit storing the multi screen information; and a control unit transmitting a multi screen request signal to the cloud server through the network interface unit when a multi screen enter command according to a user input for selecting a plurality of channels through the user interface unit is received, entering the multi screen mode according to the multi screen information included in a multi screen response signal when the multi screen response signal transmitted through a first channel is received from the cloud server, storing the multi screen information included in the multi screen response signal in the storage unit, and displaying, via the display unit, the multi screen including a plurality of multi screen configuration areas, wherein the cloud server divides one screen into the plurality of multi screen configuration areas and scales sizes of the multi screen configuration areas in order to display a plurality of programs on the one screen, and wherein when the multi screen enter command is received, the control unit is configured to:

perform a channel change according to the user input;

determine whether the channel change is repeated between the plurality of channels;

determine whether a time that at least one channel among the plurality of channels is maintained exceeds a predetermined time when the channel change is repeated between the plurality of channels; and recognize a case that the at least one channel among the plurality of channels is maintained exceeds the predetermined time as the multi screen enter command.

10. The TV according to claim 9, wherein the multi screen information comprises at least one of:

information on a number of multi screen configuration areas configuring the one screen, size information on each of the plurality of multi screen configuration areas, and program information outputted from each of the plurality of multi screen configuration areas.

11. The TV according to claim 10, wherein the multi screen request signal comprises at least one of:

TV information, information on the plurality of channels, information on the plurality of programs provided through the plurality of channels, information on the number of multi screen configuration areas configuring the one screen, and size information on each of the plurality of multi screen configuration areas.

12. The TV according to claim 10, wherein the program information outputted from each of the plurality of multi screen configuration areas comprises at least one of:

image information, sound information, and subtitle information on each of the plurality of programs provided through the plurality of programs.

13. The TV according to claim 10, wherein the program information outputted from each of the plurality of multi screen configuration areas corresponds to information on the plurality of programs that the cloud server receives through a plurality of static channels, and wherein the first channel corresponds to a dynamic channel that the TV generates to receive the multi screen response signal from the cloud server.

14. The TV according to claim 9, wherein when the multi screen enter command is received, the control unit is further configured to:

determine whether a number of channel changes exceeds a predetermined number when the channel change is repeated between the plurality of channels, and recognize a case that the number of channel changes exceeds the predetermined number as the multi screen enter command.

15. The TV according to claim 9, wherein the multi screen request signal comprises information on a plurality of channel numbers.

* * * * *